US008380004B1

(12) United States Patent  (10) Patent No.: US 8,380,004 B1
Moffat  (45) Date of Patent: Feb. 19, 2013

(54) OBJECT IMAGE MATCHING AND APPLICATIONS THEREOF

(75) Inventor: Brian Moffat, Simi Valley, CA (US)

(73) Assignee: Google Inc., Mountain View, CA (US)

( * ) Notice: Subject to any disclaimer, the term of this patent is extended or adjusted under 35 U.S.C. 154(b) by 684 days.

(21) Appl. No.: 12/477,746

(22) Filed: Jun. 3, 2009

(51) Int. Cl.
*G06K 9/64* (2006.01)
*G06K 9/36* (2006.01)
*G06K 9/62* (2006.01)

(52) U.S. Cl. ................ 382/278; 382/209; 382/286

(58) Field of Classification Search ............ None
See application file for complete search history.

(56) References Cited

U.S. PATENT DOCUMENTS

| | | | | |
|---|---|---|---|---|
| 5,261,007 | A * | 11/1993 | Hirsch | 704/237 |
| 7,120,278 | B2 * | 10/2006 | Sukegawa et al. | 382/118 |
| 7,274,822 | B2 | 9/2007 | Zhang et al. | |
| 2004/0037474 | A1 * | 2/2004 | Happel | 382/280 |
| 2005/0271297 | A1 * | 12/2005 | Zbilut et al. | 382/278 |
| 2007/0286531 | A1 * | 12/2007 | Fu et al. | 382/305 |

OTHER PUBLICATIONS

Sorting [online], www.dfstermole.net, 2007 [retrieved on Jun. 21, 2012]. Retrieved from the Internet: <URL: http://web.archive.org/web/20070206174635/http://www.dfstermole.net/Pascal/hsorting.html>, pp. 1-6.*

Zhang, L., et al., "Efficient Propagation for Face Annotation in Family Albums" Proceedings of the 12th ACM International Conference on Multimedia, Oct. 10-16, 2004, 8 pages.

* cited by examiner

*Primary Examiner* — Andrew W Johns
*Assistant Examiner* — David F Dunphy
(74) *Attorney, Agent, or Firm* — Sterne, Kessler, Goldstein & Fox PLLC

(57) ABSTRACT

Embodiments of this invention relate to matching object images, such as face images. In an embodiment, a method matches object images from a set of object images to a root object image. A set of object image lists ordered according to the relative similarity of the object images is received. Each face in the set of object images is at the origin of one of the object image lists. On a computing device, at least one element from each of the object image lists is applied to an object extraction data structure. Also on a computing device, a range of object images in the object image list is determined according to elements flagged within the object extraction data structure having a particular pattern. The range of object images matches the root object image.

14 Claims, 12 Drawing Sheets

Initial Face Similarity Ratio Matrix

| Row | | Column 0 R | 1 A | 2 B | 3 C | 4 D | 5 E | 6 F |
|---|---|---|---|---|---|---|---|---|
| 0 | R | 1 | 0.35 | 0.62 | 0.43 | 0.52 | 0.12 | 0.17 |
| 1 | A | 0.35 | 1 | 0.92 | 0.32 | 0.78 | 0.85 | 0.23 |
| 2 | B | 0.62 | 0.92 | 1 | 0.41 | 0.23 | 0.68 | 0.12 |
| 3 | C | 0.43 | 0.32 | 0.41 | 1 | 0.71 | 0.21 | 0.61 |
| 4 | D | 0.52 | 0.78 | 0.23 | 0.71 | 1 | 0.11 | 0.09 |
| 5 | E | 0.12 | 0.85 | 0.68 | 0.21 | 0.11 | 1 | 0.02 |
| 6 | F | 0.17 | 0.23 | 0.12 | 0.61 | 0.09 | 0.02 | 1 |

FIG. 4A

Root Face, Iteration 1: Determine the row 1-6 with the maximum score and switch with row and column 1

| Row | | Column 0 R | 1 B | 2 A | 3 C | 4 D | 5 E | 6 F |
|---|---|---|---|---|---|---|---|---|
| 0 | R | 1 | 0.62 | 0.35 | 0.43 | 0.52 | 0.12 | 0.17 |
| 1 | B | 0.62 | 1 | 0.92 | 0.41 | 0.23 | 0.68 | 0.12 |
| 2 | A | 0.35 | 0.92 | 1 | 0.32 | 0.78 | 0.85 | 0.23 |
| 3 | C | 0.43 | 0.41 | 0.32 | 1 | 0.71 | 0.21 | 0.61 |
| 4 | D | 0.52 | 0.23 | 0.78 | 0.71 | 1 | 0.11 | 0.09 |
| 5 | E | 0.12 | 0.68 | 0.85 | 0.21 | 0.11 | 1 | 0.02 |
| 6 | F | 0.17 | 0.12 | 0.23 | 0.61 | 0.09 | 0.02 | 1 |

Root Face, Iteration 2.1: Evaluate over f(0 ... 1, r) for column 0 ... 1 and row r from 2-6

| Row | | Column 0 | 1 | 2 | 3 | 4 | 5 | 6 | |
|---|---|---|---|---|---|---|---|---|---|
| | | R | B | A | C | D | E | F | f(column 0 ... 1, row n) |
| 0 | R | 1 | 0.62 | 0.35 | 0.43 | 0.52 | 0.12 | 0.17 | |
| 1 | B | 0.62 | 1 | 0.92 | 0.41 | 0.23 | 0.68 | 0.12 | |
| 2 | A | 0.35 | 0.92 | 1 | 0.32 | 0.78 | 0.85 | 0.23 | 1.27 |
| 3 | C | 0.43 | 0.41 | 0.32 | 1 | 0.71 | 0.21 | 0.61 | 0.84 |
| 4 | D | 0.52 | 0.23 | 0.78 | 0.71 | 1 | 0.11 | 0.09 | 0.75 |
| 5 | E | 0.12 | 0.68 | 0.85 | 0.21 | 0.11 | 1 | 0.02 | 0.8 |
| 6 | F | 0.17 | 0.12 | 0.23 | 0.61 | 0.09 | 0.02 | 1 | 0.29 |

FIG. 4D

Root Face, Iteration 2.2: Determine the row 2-6 with the maximum score and switch row and column 2. Here, row 2 has the highest score, so no switch is necessary.

| Row | | Column 0 | 1 | 2 | 3 | 4 | 5 | 6 |
|---|---|---|---|---|---|---|---|---|
| | | R | B | A | C | D | E | F |
| 0 | R | 1 | 0.62 | 0.35 | 0.43 | 0.52 | 0.12 | 0.17 |
| 1 | B | 0.62 | 1 | 0.92 | 0.41 | 0.23 | 0.68 | 0.12 |
| 2 | A | 0.35 | 0.92 | 1 | 0.32 | 0.78 | 0.85 | 0.23 |
| 3 | C | 0.43 | 0.41 | 0.32 | 1 | 0.71 | 0.21 | 0.61 |
| 4 | D | 0.52 | 0.23 | 0.78 | 0.71 | 1 | 0.11 | 0.09 |
| 5 | E | 0.12 | 0.68 | 0.85 | 0.21 | 0.11 | 1 | 0.02 |
| 6 | F | 0.17 | 0.12 | 0.23 | 0.61 | 0.09 | 0.02 | 1 |

FIG. 4E

Root Face, Iteration 3.1: Evaluate over f(0 ... 2, r) for column c ... 2 and row r from 3-6

| Row | Column 0 R | 1 B | 2 A | 3 C | 4 D | 5 E | 6 F |
|---|---|---|---|---|---|---|---|
| 0 R | 1 | 0.62 | 0.35 | 0.43 | 0.52 | 0.12 | 0.17 |
| 1 B | 0.62 | 1 | 0.92 | 0.41 | 0.23 | 0.68 | 0.12 |
| 2 A | 0.35 | 0.92 | 1 | 0.32 | 0.78 | 0.85 | 0.23 |
| 3 C | 0.43 | 0.41 | 0.32 | 1 | 0.71 | 0.21 | 0.61 |
| 4 D | 0.52 | 0.23 | 0.78 | 0.71 | 1 | 0.11 | 0.09 |
| 5 E | 0.12 | 0.68 | 0.85 | 0.21 | 0.11 | 1 | 0.02 |
| 6 F | 0.17 | 0.12 | 0.23 | 0.61 | 0.09 | 0.02 | 1 | f(column 0 ... 2, row n)
→ 1.16
→ 1.53
→ 0.75
→ 0.52

FIG. 4F

Root Face, Iteration 3.2: Determine the row 3-6 with the maximum score and switch row and column 3

| Row | Column 0 R | 1 B | 2 A | 3 D | 4 C | 5 E | 6 F |
|---|---|---|---|---|---|---|---|
| 0 R | 1 | 0.62 | 0.35 | 0.52 | 0.43 | 0.12 | 0.17 |
| 1 B | 0.62 | 1 | 0.92 | 0.23 | 0.41 | 0.68 | 0.12 |
| 2 A | 0.35 | 0.92 | 1 | 0.78 | 0.32 | 0.85 | 0.23 |
| 3 D | 0.52 | 0.23 | 0.78 | 1 | 0.71 | 0.11 | 0.09 |
| 4 C | 0.43 | 0.41 | 0.32 | 0.71 | 1 | 0.21 | 0.61 |
| 5 E | 0.12 | 0.68 | 0.85 | 0.11 | 0.21 | 1 | 0.02 |
| 6 F | 0.17 | 0.12 | 0.23 | 0.09 | 0.61 | 0.02 | 1 |

Initial Face Similarity Matrix -- Unknown Face A

| Row | | Column 0 | 1 | 2 | 3 | 4 | 5 | 6 |
|---|---|---|---|---|---|---|---|---|
| | | A | R | B | C | D | E | F |
| 0 | A | 1 | 0.35 | 0.92 | 0.32 | 0.78 | 0.85 | 0.23 |
| 1 | R | 0.35 | 1 | 0.62 | 0.43 | 0.52 | 0.12 | 0.17 |
| 2 | B | 0.92 | 0.62 | 1 | 0.41 | 0.23 | 0.68 | 0.12 |
| 3 | C | 0.32 | 0.43 | 0.41 | 1 | 0.71 | 0.21 | 0.61 |
| 4 | D | 0.78 | 0.52 | 0.23 | 0.71 | 1 | 0.11 | 0.09 |
| 5 | E | 0.85 | 0.12 | 0.68 | 0.21 | 0.11 | 1 | 0.02 |
| 6 | F | 0.23 | 0.17 | 0.12 | 0.61 | 0.09 | 0.02 | 1 |

FIG. 5A

Unknown Face A, Iteration 1: Determine the row 1-6 with the maximum score and switch places with row and column 1

| Row | | Column 0 | 1 | 2 | 3 | 4 | 5 | 6 |
|---|---|---|---|---|---|---|---|---|
| | | A | B | R | C | D | E | F |
| 0 | A | 1 | 0.92 | 0.35 | 0.32 | 0.78 | 0.85 | 0.23 |
| 1 | B | 0.92 | 1 | 0.62 | 0.41 | 0.23 | 0.68 | 0.12 |
| 2 | R | 0.35 | 0.62 | 1 | 0.43 | 0.52 | 0.12 | 0.17 |
| 3 | C | 0.32 | 0.41 | 0.43 | 1 | 0.71 | 0.21 | 0.61 |
| 4 | D | 0.78 | 0.23 | 0.52 | 0.71 | 1 | 0.11 | 0.09 |
| 5 | E | 0.85 | 0.68 | 0.12 | 0.21 | 0.11 | 1 | 0.02 |
| 6 | F | 0.23 | 0.12 | 0.17 | 0.61 | 0.09 | 0.02 | 1 |

Unknown Face A, Iteration 2.1: Evaluate over f(0 ... 1, n) for column 0 ... 1 and row n from 2-6

| | Column | | | | | | | f(column 0 ... 1, row n) |
|---|---|---|---|---|---|---|---|---|
| Row | 0 A | 1 B | 2 R | 3 C | 4 D | 5 E | 6 F | |
| 0 A | 1 | 0.92 | 0.35 | 0.32 | 0.78 | 0.85 | 0.23 | |
| 1 B | 0.92 | 1 | 0.62 | 0.41 | 0.23 | 0.68 | 0.12 | |
| 2 R | 0.35 | 0.62 | 1 | 0.43 | 0.52 | 0.12 | 0.17 | 0.97 |
| 3 C | 0.32 | 0.41 | 0.43 | 1 | 0.71 | 0.21 | 0.61 | 0.73 |
| 4 D | 0.78 | 0.23 | 0.52 | 0.71 | 1 | 0.11 | 0.09 | 1.01 |
| 5 E | 0.85 | 0.68 | 0.12 | 0.21 | 0.11 | 1 | 0.02 | 1.53 |
| 6 F | 0.23 | 0.12 | 0.17 | 0.61 | 0.09 | 0.02 | 1 | 0.35 |

FIG. 5D

Unknown Face A, Iteration 2.2: Determine the row 2-6 with the maximum score and switch row and column 2

| | Column | | | | | | |
|---|---|---|---|---|---|---|---|
| Row | 0 A | 1 B | 2 E | 3 C | 4 D | 5 R | 6 F |
| 0 A | 1 | 0.92 | 0.85 | 0.32 | 0.78 | 0.35 | 0.23 |
| 1 B | 0.92 | 1 | 0.68 | 0.41 | 0.23 | 0.62 | 0.12 |
| 2 E | 0.85 | 0.68 | 1 | 0.21 | 0.11 | 0.12 | 0.02 |
| 3 C | 0.32 | 0.41 | 0.21 | 1 | 0.71 | 0.43 | 0.61 |
| 4 D | 0.78 | 0.23 | 0.11 | 0.71 | 1 | 0.52 | 0.09 |
| 5 R | 0.35 | 0.62 | 0.12 | 0.43 | 0.52 | 1 | 0.17 |
| 6 F | 0.23 | 0.12 | 0.02 | 0.61 | 0.09 | 0.17 | 1 |

FIG. 5E

Unknown Face A, Iteration 3.1: Evaluate over f(0 ... 2, n) for column n ... 1 and row n from 3-6

| Row | Column 0 | 1 | 2 | 3 | 4 | 5 | 6 | |
|---|---|---|---|---|---|---|---|---|
| | | R | B | A | C | D | E | F |
| 0 | R | 1 | 0.62 | 0.35 | 0.43 | 0.52 | 0.12 | 0.17 |
| 1 | B | 0.62 | 1 | 0.92 | 0.41 | 0.23 | 0.68 | 0.12 |
| 2 | A | 0.35 | 0.92 | 1 | 0.32 | 0.78 | 0.85 | 0.23 |
| 3 | C | 0.43 | 0.41 | 0.32 | 1 | 0.71 | 0.21 | 0.61 → 1.16 |
| 4 | D | 0.52 | 0.23 | 0.78 | 0.71 | 1 | 0.11 | 0.09 → 2.24 |
| 5 | E | 0.12 | 0.68 | 0.85 | 0.21 | 0.11 | 1 | 0.02 → 1.01 |
| 6 | F | 0.17 | 0.12 | 0.23 | 0.61 | 0.09 | 0.02 | 1 → 0.52 | f(column 0 ... 2, row n)

FIG. 5F

Unknown Face A, Iteration 3.2: Determine the row 3-6 with the maximum score and switch row and column 3

550

| Row | Column 0 | 1 | 2 | 3 | 4 | 5 | 6 |
|---|---|---|---|---|---|---|---|
| | | R | B | A | D | C | E | F |
| 0 | R | 1 | 0.62 | 0.35 | 0.52 | 0.43 | 0.12 | 0.17 |
| 1 | B | 0.62 | 1 | 0.92 | 0.23 | 0.41 | 0.68 | 0.12 |
| 2 | A | 0.35 | 0.92 | 1 | 0.78 | 0.32 | 0.85 | 0.23 |
| 3 | D | 0.52 | 0.23 | 0.78 | 1 | 0.71 | 0.11 | 0.09 |
| 4 | C | 0.43 | 0.41 | 0.32 | 0.71 | 1 | 0.21 | 0.61 |
| 5 | E | 0.12 | 0.68 | 0.85 | 0.11 | 0.21 | 1 | 0.02 |
| 6 | F | 0.17 | 0.12 | 0.23 | 0.09 | 0.61 | 0.02 | 1 |

... [continue for each remaining column]

... [continue for each remaining face]

FIG. 6B

Applying The First Element of Each Face List

| Row | | R | B | C | A | D | E | F |
|---|---|---|---|---|---|---|---|---|
| 6 | F | 0 | 0 | 0 | 0 | 0 | 0 | 1 |
| 5 | E | 0 | 0 | 0 | 0 | 0 | 1 | 0 |
| 4 | D | 0 | 0 | 0 | 0 | 1 | 0 | 0 |
| 3 | A | 0 | 0 | 0 | 1 | 0 | 0 | 0 |
| 2 | C | 0 | 0 | 1 | 0 | 0 | 0 | 0 |
| 1 | B | 0 | 1 | 0 | 0 | 0 | 0 | 0 |
| 0 | R | 1 | 0 | 0 | 0 | 0 | 0 | 0 |
| | | 0 | 1 | 2 | 3 | 4 | 5 | 6 |

Column

Applying The Second Element of Each Face List

| Row | | R | B | C | A | D | E | F |
|---|---|---|---|---|---|---|---|---|
| 6 | F | 0 | 0 | 0 | 0 | 0 | 1 | 1 |
| 5 | E | 0 | 0 | 0 | 0 | 1 | 1 | 0 |
| 4 | D | 0 | 0 | 0 | 1 | 0 | 1 | 0 |
| 3 | A | 0 | 1 | 0 | 1 | 0 | 0 | 0 |
| 2 | C | 0 | 0 | 1 | 0 | 0 | 0 | 0 |
| 1 | B | 1 | 1 | 1 | 1 | 0 | 0 | 0 |
| 0 | R | 1 | 0 | 0 | 0 | 0 | 0 | 0 |
| | | 0 | 1 | 2 | 3 | 4 | 5 | 6 |

Column

Face Lists
R, B, C, A, D, E, F
A, B, E, D, R, C, F
B, A, E, R, C, D, F
C, B, D, R, F, A, E
D, E, C, R, B, A, F
E, F, B, C, R, D, A
F, D, A, R, B, C, E

Face Lists-Reordered
R, B, C, A, D, E, F
B, A, E, R, C, D, F
C, B, D, R, F, A, E
A, B, E, D, R, C, F
D, E, C, R, B, A, F
E, F, B, C, R, D, A
F, D, A, R, B, C, E 608
602
604

Applying The Third Element of Each Face List

| Row | | 0 | 1 | 2 | 3 | 4 | 5 | 6 |
|---|---|---|---|---|---|---|---|---|
| 6 | F | 0 | 0 | 0 | 0 | 1 | 1 | 1 |
| 5 | E | 0 | 1 | 0 | 0 | 1 | 1 | 1 |
| 4 | D | 0 | 0 | 0 | 0 | 1 | 1 | 1 |
| 3 | A | 0 | 1 | 1 | 1 | 0 | 0 | 0 |
| 2 | C | 1 | 0 | 1 | 0 | 1 | 0 | 0 |
| 1 | B | 1 | 1 | 1 | 1 | 0 | 0 | 0 |
| 0 | R | 1 | 0 | 0 | 1 | 0 | 0 | 0 |
| | | R | B | C | A | D | E | F |
| | | 0 | 1 | 2 | 3 | 4 | 5 | 6 |
| | | Column | | | | | | |

Applying The Fourth Element of Each Face List

| Row | | 0 | 1 | 2 | 3 | 4 | 5 | 6 |
|---|---|---|---|---|---|---|---|---|
| 6 | F | 0 | 0 | 0 | 1 | 1 | 1 | 1 |
| 5 | E | 0 | 1 | 0 | 1 | 1 | 1 | 1 |
| 4 | D | 0 | 0 | 0 | 1 | 1 | 1 | 1 |
| 3 | A | 1 | 1 | 1 | 1 | 0 | 1 | 0 |
| 2 | C | 1 | 0 | 1 | 1 | 1 | 0 | 0 |
| 1 | B | 1 | 1 | 1 | 1 | 0 | 0 | 0 |
| 0 | R | 1 | 1 | 1 | 1 | 0 | 0 | 1 |
| | | R | B | C | A | D | E | F |
| | | 0 | 1 | 2 | 3 | 4 | 5 | 6 |
| | | Column | | | | | | |

OBJECT IMAGE MATCHING AND APPLICATIONS THEREOF

BACKGROUND

1. Field of the Invention

This invention generally relates to image recognition.

2. Related Art

Widespread use of digital cameras has led to individuals amassing large quantities of digital photos. An individual may share digital photos via photo sharing web sites, such as the PICASSAWEB site available from Google Inc. Some photo sharing sites enable a user to name an object, such as a face, that appears in one or more photos. Naming each face in a large photo collection can be tedious and time-consuming for a user.

Some photo sharing sites attempt to group similar looking faces together, enabling the user to name the group of faces. While these techniques have advantages, they tend not to be scalable. Often, a group of faces that can be matched has a maximum size, above which the accuracy of face matching diminishes.

Systems and methods are needed that match a large number of object images, such as face images.

BRIEF SUMMARY

Embodiments of this invention relate to matching object images, such as face images. In a first embodiment, a method matches object images from a set of object images to a root object image. A set of object image lists, ordered according to the relative similarity of the object images, is determined. Each face in the set of object images is at the origin of one of the object image lists. On a computing device, at least one element from each of the object image lists is applied to an object extraction data structure. Also on a computing device, a range of object images in the object image list is determined according to elements flagged within the object extraction data structure having a particular pattern. The range of object images matches the root object image.

In a second embodiment, a system matches object images from a set of object images to a root object image. The system includes a processor and a memory, coupled to the processor, that stores an object extraction module, a data structure generator module, and a shape detector module. The object extraction module receives a set of object image lists ordered according to the relative similarity of the object images. Each face in the set of object images is at the origin of one of the object image lists. The matrix generator module applies at least one element from each of the object image lists to an object extraction data structure. Finally, a shape detector module determines a range of object images in the object image list according to elements flagged within the object extraction data structure having a particular pattern. The range of object images matches the root object image.

In a third embodiment, a method determines the relative similarity of object images. A computing device, an object similarity matrix with a first axis and a second axis is determined. In the object similarity matrix, a value at a position (x, y) represents a degree of similarity between an object image x and an object image y. On a computing device, a score is determined for each unsorted object image on the first axis. Also on a computing device, values on both axes of the similarity matrix corresponding to the object image are swapped with values on both axes corresponding to the face with the highest score determined by the score evaluator module with an unsorted object image, sorting the previously unsorted object image. Finally, the scoring and swapping are repeated to sort each object image in the object similarity matrix.

In a fourth embodiment, a system determines the relative similarity of object images. The system includes a processor and a memory, coupled to the processor, that stores an object similarity module, a score evaluator module, a swap module, and an object ordering module. The object similarity module determines an object similarity matrix with a first axis and a second axis. In the object similarity matrix, a value at a position (x, y) represents a degree of similarity between an object image x and an object image y. The score evaluator module determines a score for each unsorted object image on the first axis. The swap module swaps values on both axes of the similarity matrix corresponding to the object image with the highest score determined by the score evaluator module with an unsorted object image to sort the previously unsorted object image. Finally, the object ordering module that signals the score evaluator module and the swap module to repeatedly score and swap, sorting each object image in the object similarity matrix.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings.

Figure 2:
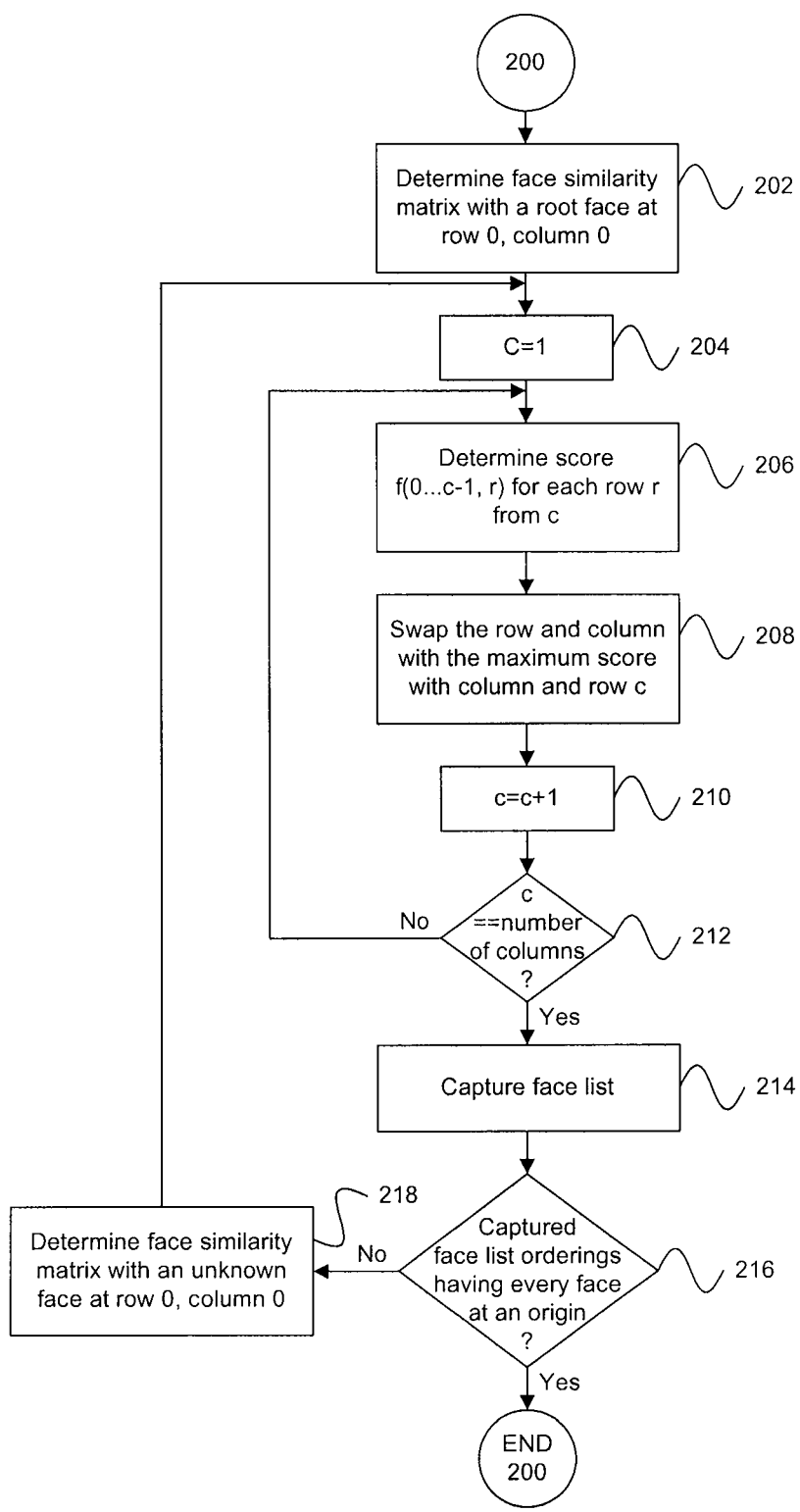
FIG. 2 is a flowchart illustrating a face ordering method, which may be used in operation of the system in FIG. 1.

FIGS. 4A-F illustrate an example operation of the method in FIG. 2.

FIGS. 5A-F illustrate another example operation of the method in FIG. 2.

Figure 3:
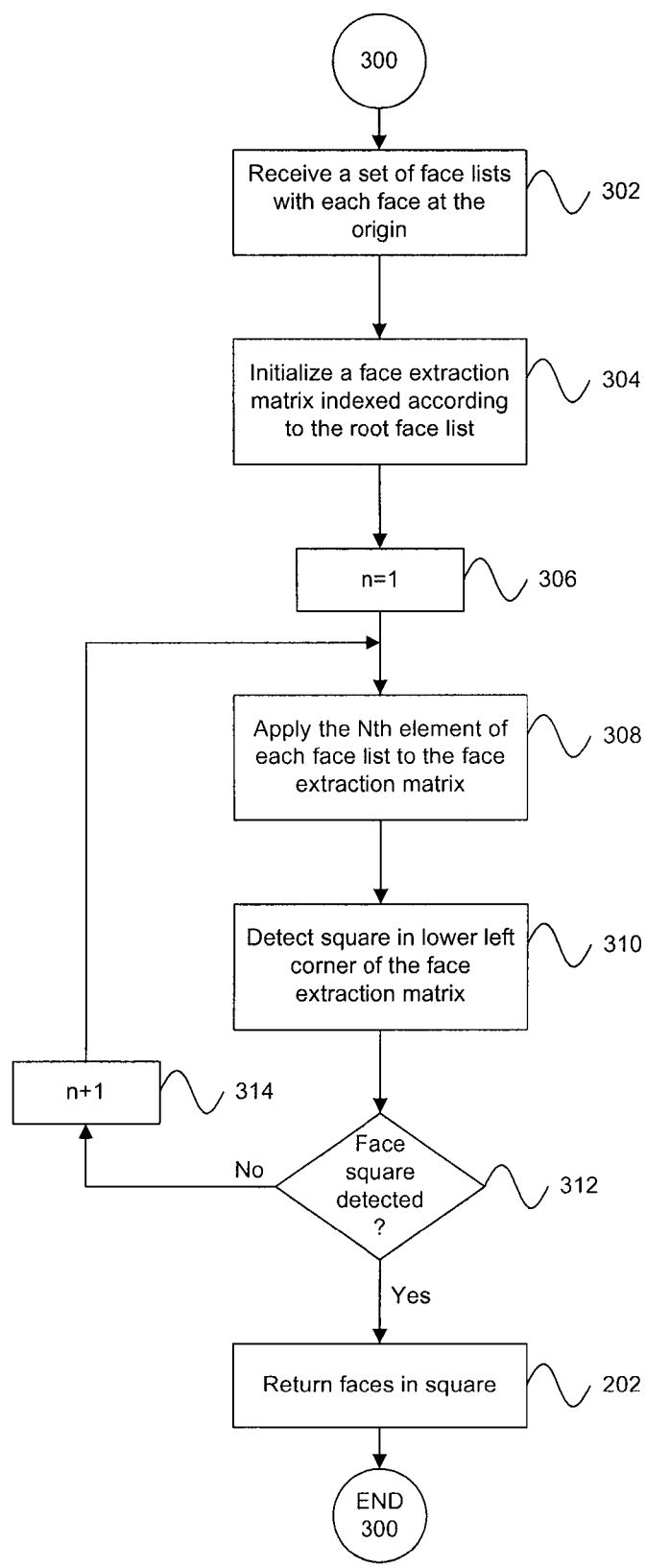
FIG. 3 is a flowchart illustrating a face extraction method, which may be used in operation of the system in FIG. 1.

FIGS. 6A-E illustrate an example operation of the method in FIG. 3.

Figure 1:
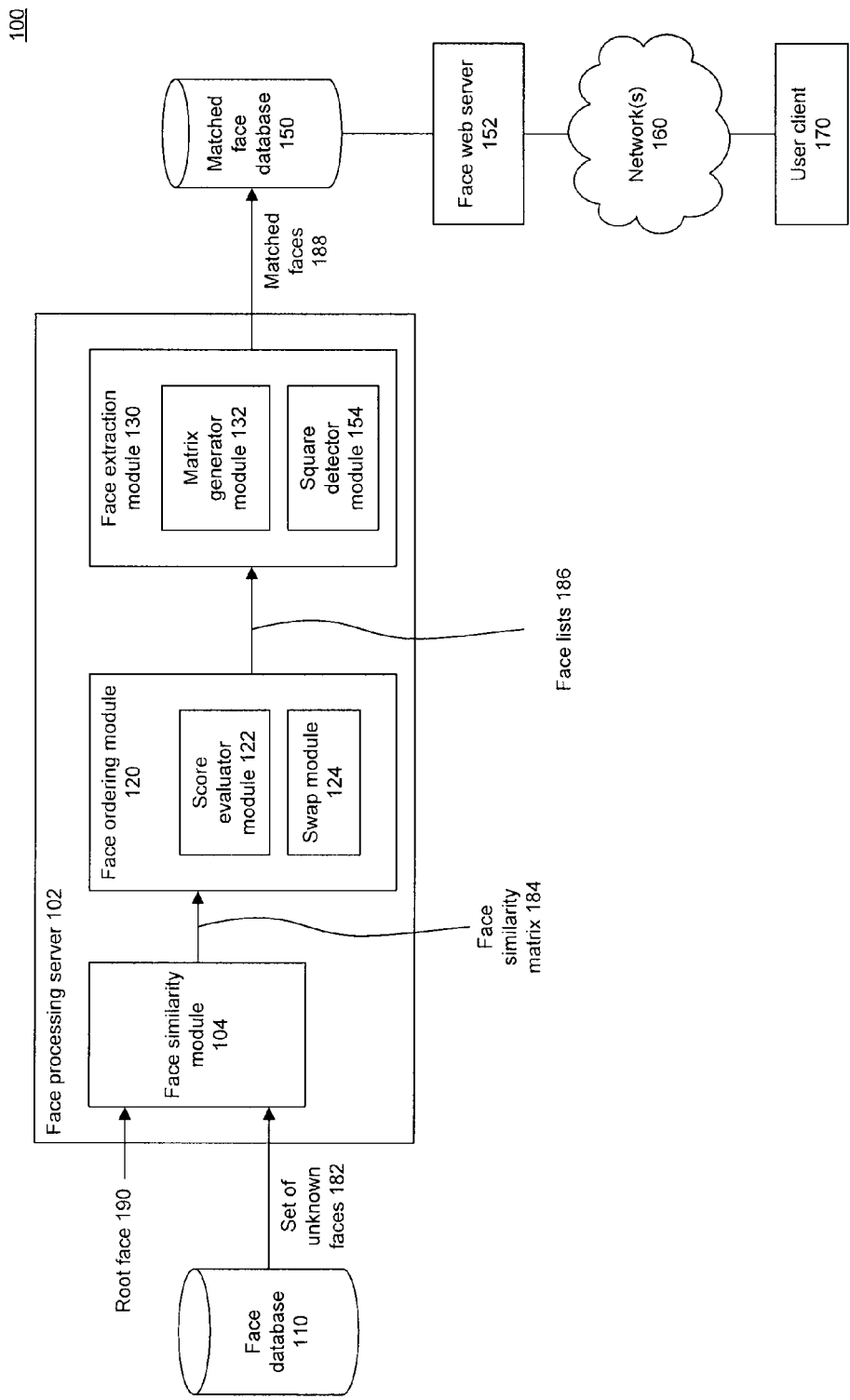
FIG. 1 is a diagram illustrating a system for matching face images according to an embodiment of the present invention.
Figure 7:
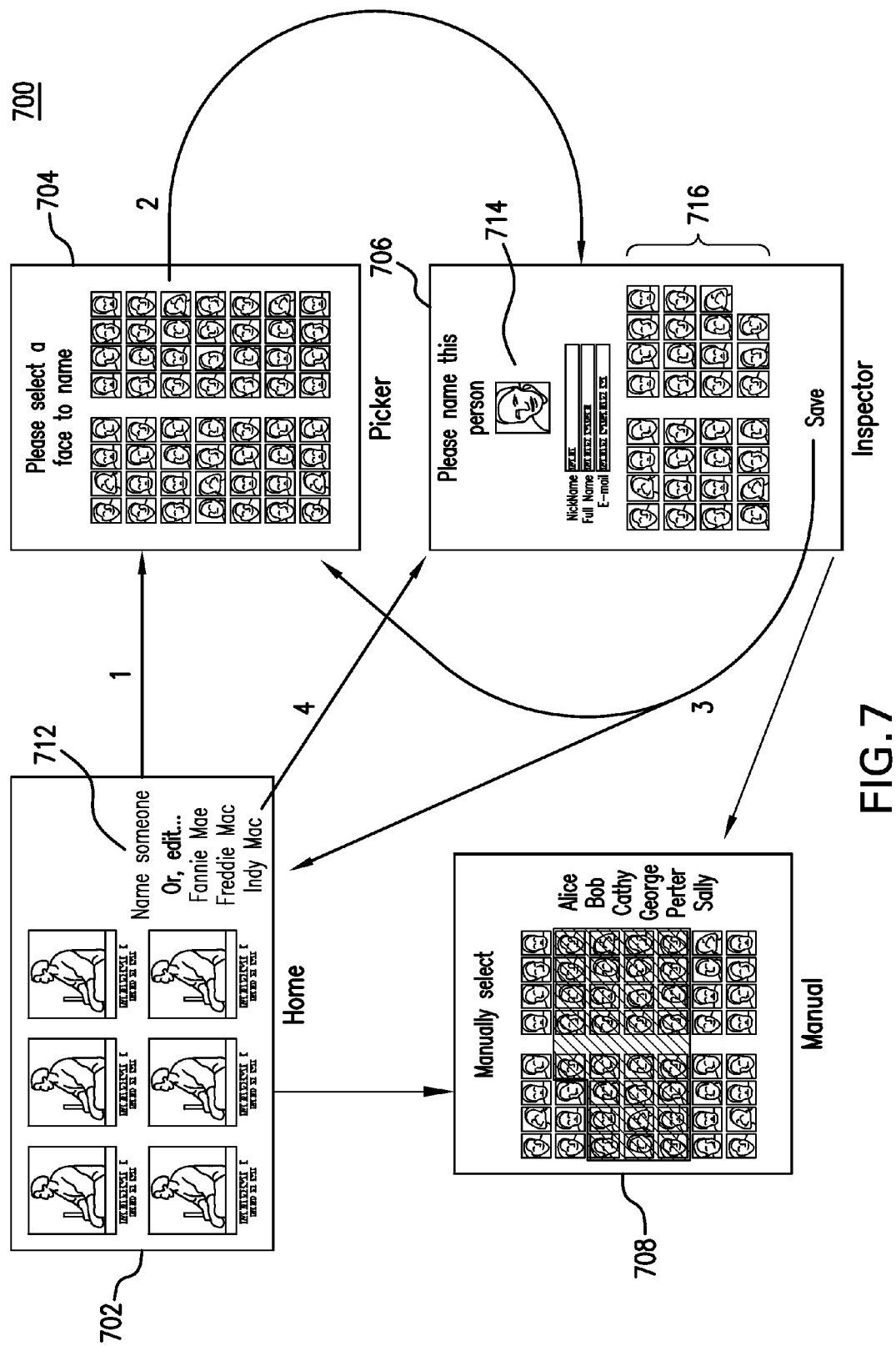

FIG. 7 illustrates an example user interface, which may be used by the system in FIG. 1.

In the drawings, like reference numbers may indicate identical or functionally similar elements.

DETAILED DESCRIPTION OF DRAWINGS

The present invention relates to matching object images, including face images. From a face with a known identity, embodiments can identify other faces having the same identity. As an advantage, some embodiments can identify any number of faces from a group of faces having any size. Thus, embodiments of the present invention offer a scalable way to match object images.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Although embodiments are described with respect to face image matching for clarity, it would be recognized by a person of skill in the art that embodiments can also match images of other objects as well.

FIG. 1 illustrates a system 100 for matching face images according to an embodiment of the present invention. System 100 includes a face database 110, a face processing server 102, a matched face database 150, and a face web server 152. Face processing server 102 is coupled between face database 110 and matched face database 150. Face web server 152 is coupled to matched face database 150. Face web server 152 is coupled to matched face database 150. A user client 170 may be coupled to the face web server 152 via one or more networks 160, such as the Internet.

In general, system 100 operates as follows. Face processing server 102 receives a root face 190 and a set of unknown faces 182. Face processing server 102 may receive set of unknown faces 182 from face database 110. Root face 190 may, for example, be a face image having a known identity. For example, a user may have entered a name corresponding to root face 190. Face processing server 102 determines one or more matched faces 188 that are a set of face images from set of unknown faces 182 that match root face 190. For example, face processing server 102 may determine matched faces 188 that have the same identity as root face 190. Face processing server 102 stores the matched faces 188 to a matched face database 150. In response to a request from user client 170, face web server 152 may recall matched faces 188 and send them to user client 170 for display. In this way, system 100 determines faces matching a root face and displays them to a user. The operation of system 100 and its various components are described in more detail below.

Face processing server 102 identifies faces from set of unknown faces 182 that match root face 190 and returns them as matched faces 188. Face processing server 102 includes a face similarity module 104, a face ordering module 120, and a face extraction module 130. The operation of face processing server 102 is described generally below with respect to FIG. 1 and is described in more detail with respect to FIGS. 2 and 3.

Face processing server 102 may, for example, receive set of unknown faces 182 or root face 190 using a SQL select statement. Alternatively, set of unknown faces 182 or root face 190 may be pushed to face processing server 102 via, for example, a web service. These examples are merely illustrative.

Once face processing server 102 receives root face 190 and set of unknown faces 182, face processing server 102 generally operates as follows. Face similarity module determines a faces similarity matrix 184 describing the relative similarity of every face image (including root face 190 and unknown faces 182) to every other face image. The term "matrix" as used herein generally describes any data structure that includes elements addressable with at least two indexes. Other data structures may be used as would be recognized by a person of skill in the art. Row zero and column zero in the root face may correspond to the root face and each additional row and column may correspond to one of the unknown faces 182. Each value at position (x, y) in face similarity matrix 184 may represent a degree of similarity between a face image x and a face image y. Faces similarity matrix 184 may determine the degree of similarity by applying any one of well-known similarity algorithms. In one illustrative example, a similarity algorithm may operate by identifying a feature vector corresponding to each image and determining a Euclidean distance between the feature vectors.

Using face similarity matrix 184, face ordering module 120 determines face lists 186 ordered according to the relative similarity of the various faces. Face ordering module 120 includes a score evaluator module 122 and a swap module 124. Score evaluator module 122 determines a score based on face similarity matrix 184. Swap module 124 reorders the values in face similarity matrix 184 based on the score determined by score evaluator module 122. Face ordering module 120 controls score evaluator module 122 and swap module 124 and signals the modules to repeatedly score and swap data values to order the values in face similarity matrix 184. How the faces may be ordered is described in more detail below with respect to FIG. 2.

At certain points during the face ordering, face lists are captured and sent to face extraction module 130 as face lists 186. Each face list is an ordered list of face images. Each face list in face lists 186 may have a different face at its origin. For example, each face list may have an unknown face or root face at its origin. Further, each face list may include every face ordered according to the faces' relative similarity. For example, suppose R is a root face and A-F are unknown faces. There may be face lists starting with each of A-F and R. Further, each face list includes A-F and R, and is ordered according to the similarity of the face at the origin to each of the other faces. Example face lists are illustrated in FIG. 6A and described further below.

Using face lists 186, face extraction module 130 identifies matched faces 188 that match root face 190. To identify matched faces 188, face extraction module 130 uses a matrix generator module 132 and a square detector module 154. Matrix generator module 132 may create and initialize a face extraction matrix. As mentioned earlier, use of a matrix is merely illustrative, other data structures may be used as would be recognized by a person skilled in the art given this description. Matrix generator module 132 may repeatedly apply an element from each of the face lists 186 to the face extraction matrix by, for example, flagging cells in the matrix.

Square detector module 154 evaluates the cells flagged in the face extraction matrix. When the cells flagged in the face extraction matrix resemble a square positioned toward the origin of the face extraction matrix, then face extraction module returns the corresponding faces as matched faces 188. Other shapes or patterns may be detected aside from a square. Matched faces 188 may be, for example, the faces corresponding to the columns or rows occupied to by the square detected by square detector module 154.

In an embodiment, detector module 154 may detect a pattern by determining a range value. The portions of the face lists running to the range value may result in a maximum similarity value when applied to a similarity function. In that case, the range of face images in the face image list beginning with the root object image, the range running to the range value may be the matching face images.

Face processing server 102 may store matched faces 188 in matched face database 150, or face processing server 102 may send matched faces 188 directly to face web server 152 to be formatted for display on user client 170.

Each of face similarity module 104, face ordering module 120, score evaluator module 122, swap module 124, face extraction module 130, matrix generator module 132 and square detector module 154 may be implemented in hardware, software, firmware or any combination thereof.

Face processing server 102, face web server 152 and user client 170 may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Face web server 152 may be, for example, a photo sharing site, such as a PICASSAWEB site. Face web server 152 may include a web server that responds to a hypertext transfer protocol (HTTP) request with an HTTP reply. As illustrative examples, the web server may be, without limitation, Apache HTTP Server, Apache Tomcat, MICROSOFT Internet Information Server, JBoss Application Server, WEBLOGIC Application Server, or SUN Java System Web Server. The web server may serve content such as hypertext markup language (HTML), extendable markup language (XML), documents, videos, images, multimedia features, or any combination thereof. These examples are strictly illustrative and do not limit the present invention.

Face web server 152 may send content to user client 170. User client 170 may include a browser, such as a web browser, that communicates with face web server 152 to display content to a user. User client 170 may also accept input from a user and send data to face web server 152.

By communicating with face web server 152, user client 170 may display matched faces, such as matched faces 188, to a user. In this way, system 100 identifies faces in set of unknown faces 182 that match root face 190 and displays the matched faces to the user. To identify the matched faces, system 100 executes a face ordering method and a face extraction method. A face ordering method is described with respect to FIG. 2, and a face extraction method is described with respect to FIG. 3.

Face Ordering

FIG. 2 is a flowchart illustrating a face ordering method 200. For clarity, method 200 is described with respect to illustrative examples on FIGS. 4A-F and 5A-F. However, the method should not be limited thereto. A person skilled in the art given this description would recognize other applications of face ordering method 200.

Method 200 begins by determining a face similarity matrix at step 202. An example face similarity matrix is illustrated in example 400 in FIG. 4A. FIG. 4A shows an initial face similarity matrix 402 that illustrates a degree of similarity between each of faces A-F and R. Face R may be a root face and faces A-F may be unknown faces. In face similarity matrix 402, each cell (x, y) has a value between zero and one denoting a degree of similarity between a face x and a face y. As discussed above, the degree of similarity may be determined using known similarity functions. As shown in face similarity matrix 402, the degree of similarity between face A and face R is 0.35. As another example, the degree of similarity between face A and face D is 0.78. Also, note that the diagonal of the matrix is the maximum similarity value (in this case one) because for those cells faces are compared with themselves. As mentioned earlier, the degree of similarity may be determined by applying any one of well-known similarity algorithms. In one illustrative example, a similarity algorithm may operate by identifying a feature vector corresponding to each image and determining a Euclidean distance between the feature vectors.

Similarity values for the root face are at the origin of each axis. In other words, each value having a row or column zero compares a face with the root face. As mentioned earlier, the root face may be a face image having a known identity. In the case where multiple face images have the known identity (for example multiple faces that the user has identified as being "John Doe"), the root face may be a composite face. Alternatively, the similarity values for the root face may be an aggregate (such as an average or median) of the similarity values for several known face images. For example, suppose the user had identified two face images as being "John Doe". When determining the similarity value for face B, the face similarity function may be applied to the first known face and face B yielding a value of 0.57, and the face similarity function may be applied to the second known face and face B yielding a value of 0.67. The values 0.57 and 0.67 may be averaged to determine the similarity value between face B and the root face R. Thus, the similarity value may be 0.62.

After the initial face similarity matrix is determined at step 202, method 200 enters into an outer and inner loop. A loop index "c" for the inner loop is set to one at step 204. At step 206, a score is determined according to a function f(0 . . . c-1, r) for each row r starting at c. Although other functions may be used, in examples herein f(0 . . . c-1, r) for a given r is simply the sum of all the values in the columns from column 0 to column c-1 for row r. At step 208, the row and column with the maximum score are swapped with row and column c. At step 210, the value c is incremented. As illustrated by decision block 212, the inner loop may be repeated until c is greater than or equal to the number of columns. An example operation of the inner loop is illustrated in FIGS. 4B-F.

The first iteration of the inner loop is illustrated by a diagram 410 in FIG. 4B. At the first iteration, the loop index c is set to 1. To determine the score for each row r, all the values in the columns from column 0 to column c-1 for the row r are summed. With c being one, the sum runs from column 0 to column 0. In other words, for the first iteration, no sum is required. The score for each row is simply the value of the row at column 0. Looking to face similarity matrix 402 in FIG. 4A, the scores for the rows corresponding to faces A, B, C, D, E, and F are 0.35, 0.62, 0.43, 0.52, 0.12, and 0.17 respectively. The row corresponding to face B has the highest score. Thus, the row and column corresponding to face B is swapped with row and column 1. The resulting matrix is illustrated by a face similarity matrix 412 in FIG. 4B.

For the second iteration of the inner loop, the loop index c is incremented to 2. The second iteration is illustrated in diagrams 420 and 430 in FIGS. 4C and 4D. First, the score for each row starting at row 2 is determined as at step 206. To determine the score for each row, the sum of the values in for columns 0-1 are taken for that row. For example, in row 2, the values at columns 0 and 1 are 0.35 and 0.92. The sum of 0.35 and 0.92 is 1.27. Thus, the score for row 2 is 1.27. The scores for each row are illustrated in diagram 420 at column 424.

Once the scores are determined, a face image corresponding to the row with the maximum score is determined. The face's corresponding row and column are swapped with row and column 2 at step 208. In diagram 420, row 2 has the highest score. Since step 208 would effectively swap row and column 2 with itself, no swap is necessary. This is illustrated in diagram 430 in FIG. 4D. In diagram 430, a face similarity matrix 432 has not undergone a swap.

FIGS. 4E-F illustrate a third iteration of the inner loop in diagrams 440 and 450. For the third iteration, the loop index c is incremented to 3. In diagram 440, the scores are calculated at column 444. Row 4 has the highest score. So, row and column 4 is swapped with row and column 3 as illustrated in diagram 450.

Referring back to FIG. 2, decision block 212 repeats the inner loop at steps 206-210 until the loop index c is equal to the number of columns. At that point the faces in the matrix are sorted generally according to the degree of similarity to the root face R. So, the row and column of values corresponding to the root face R would be at row 0 and column 0 in the face similarity matrix. At step 214, the order of the faces in the matrix is captured. The face list begins with a root face R. For example, the captured face list may be "R, B, C, A, D, E, F".

After capturing the face list, steps 204-214 are repeated for different face similarity matrixes having different faces at their origin. At step 218, a new face similarity matrix is determined with values corresponding to an unknown face at row and column zero. Decision block 216 repeats the process until face lists are captured having every face at an origin. An example of how steps 204-214 are repeated is illustrated in FIGS. 5A-F.

FIG. 5A shows a diagram 500 with an example face similarity matrix 502. Face similarity matrix 502 has values corresponding to an unknown face A at row and column zero.

FIGS. 5B-F illustrate iterations of the inner loop to sort the face similarity matrix. The inner loop operates in much the same way as described with respect to FIGS. 4B-F. In FIG. 5B, a row from row 1-6 is determined having the maximum score. The corresponding row and column are swapped with row and column 1 of face similarity matrix 502. In FIG. 5C, the score f(column 0 . . . 1, row n) is evaluated for columns 0 . . . 1 and each row n, where n goes from 2-6. In FIG. 5D, the row and column with the maximum score are swapped with row and column 2. In FIG. 5E, the score f(column 0 . . . 2, row n) is evaluated for columns 0 . . . 2 and each row n, where n goes from 3-6. In FIG. 5F, the row and column with the maximum score are swapped with row and column 3. Once the face similarity matrix is sorted, the order of the faces in the matrix is captured. The captures face list begins with an unknown face A. For example, the captured face list may be "A, B, E, D, R, C, F". The process is repeated for each face.

At the completion of method 200 in FIG. 2, a matrix has been sorted for each and every face. As result, each face is at the origin of one captured face list. Example face lists are illustrated in FIG. 6A. How the captured face lists may be used to determine matching faces is illustrated in FIG. 3.

Face Extraction

FIG. 3 is a flowchart illustrating a method 300 for determining matching faces using the face lists, such as those captured in method 200 in FIG. 2. For clarity, method 300 is described with respect to examples in FIGS. 6A-E. However, method 300 should not be limited thereto.

Method 300 begins by receiving a set of face lists. Each face, including the root face and each unknown face, is at the origin of one face list in the set of face lists. An example set of face lists is illustrated in diagram 608 in FIG. 6A. Diagram 608 shows a set of face lists 602. The set of face lists 602 are reordered at 604 according to the order of faces in the root face list. This reordering set is optional and is shown here to make the remaining steps of method 300 easier to follow.

Once the face lists are received, a face extraction matrix indexed according to the root face list is initialized at step 304. FIG. 6B shows an example face extraction matrix 610 indexed according to the root face list. Each row and column corresponds to a face and is ordered according to the face list that starts with the root face—"R, B, C, A, D, E, F".

When the face extraction matrix initialized, method 300 enters a loop. The loop index n is set to one at step 306. At step 308 the nth element of each face list is applied to the face extraction matrix. The nth element of each face list may be applied by flagging the value of the matrix that has a column corresponding to the first element of the face list and a row corresponding to the nth face of the face list.

At step 310, the flagged elements are examined to see if they resemble a particular shape. For example, the shape may be a square positioned towards the origin of the face extraction matrix. The square may have elements missing. Further, the square may be a requisite size. For example, the square may have to be larger than 2 by 2. Or, in an alternative embodiment, a square smaller than or equal to the requisite size may be acceptable only if no larger square is detected.

If the shape is detected at decision block 312, then faces corresponding to the shape are returned at step 202. Otherwise, the loop index is incremented at step 314 and another iteration of steps 308 and 310 occur. The loop repeats until either the shape is detected or the face extraction matrix fills up. If the face extraction matrix fills up prior to the shape being detected, then no face matches may be returned. In an alternative, method 300 may be repeated to look for a different shape. An example operation of method 300 is illustrated in FIGS. 6B-E.

FIG. 6B shows face extraction matrix 610 where the first element of each face list has been applied. As mentioned above, the nth element of each face list is applied by flagging the value of the matrix that has a column corresponding to the first element of the face list and a row corresponding to the nth face of the face list. So, the first element of each face list is applied by flagging the value of the matrix that has a column corresponding to the first element of the face list and a row corresponding to the first face of the face list. In other words, for each face x the cell (x, x) is flagged. For this reason, the first iteration results in a diagonal across face extraction matrix 610. At this point, no square is detected in face extraction matrix 610, so the loop repeats for a second iteration.

The second iteration is illustrated in FIG. 6B. FIG. 6B shows face extraction matrix 620 where the second element of each face list has been applied. In face extraction matrix 620, the second element of each face list is applied by flagging the value of the matrix that has a column corresponding to the first element of the face list and a row corresponding to the second face of the face list. For example, the face list for root face R has as its second element unknown face B. Thus, the element of face extraction matrix 610 at column zero corresponding to face R and row one corresponding to face B is flagged. In another example, the face list for unknown face D has as its second element unknown face E. Thus, the element of face extraction matrix 610 at column four corresponding to unknown face D and row five corresponding to face E is flagged. After applying the second element of each face list to face extraction matrix 620, the elements flagged in face extraction matrix 620 still do not resemble a square positioned towards the matrix's origin. Thus, the loop repeats.

A third iteration of the loop is illustrated with a face extraction matrix 640 in FIG. 6D. The third element of each face list has been applied to face extraction matrix 640 in much the same way as described for previous iterations. The elements flagged in the face extraction matrix 640 still do not resemble a square positioned at the matrix's origin. As result, the loop repeats for a fourth iteration as illustrated at a face extraction matrix 650 in FIG. 6E. In face extraction matrix 650, a shape 652 is detected. Shape 652 need not be a perfect square. In this example, shape 652 only resembles a square as it has an element 654 that is not flagged. In other examples, an entire row or column of the shape may not be flagged.

With shape 652 detected, faces corresponding to shape 652 are returned as the faces matching the root face R. In this example, shape 652 occupies columns 0-3 corresponding to faces R, B, C, and A. Thus, faces A, B, and C match root face R.

As mentioned above, the face matching process described for FIGS. 2-3 is scalable. The matrix may be expanded to search any number of unknown faces with any number of matching faces. In contrast to some other face matching methods, the face matching process described for FIGS. 2-3 may not diminish in accuracy as the number of unknown and matching faces grow. In fact, the accuracy of the face matching process may actually improve as the pool of faces grows. This effect may be due to the way the process aggregates similarity values in scoring and sorting faces.

Example User Interface

FIG. 7 is a diagram 700 illustrating an example user interface, which may be used by system 100 in FIG. 1. The example user interface may be, for example, a user interface of a photo sharing website. In diagram 700, screenshot 702 may be a main page for the photo sharing website. By clicking on a link 712, the user may navigate to a face naming interface at a display view 704. Display view 704 includes a listing of unnamed face images. The face images may be, for example, detected and parsed out of a photographs uploaded by a user.

When a user selects an unnamed face image in display view 704, the face matching algorithm described above with respect to FIGS. 2-3 may be executed to determine other matching face images. In executing the algorithm, the root face may be the face selected by the user and the unknown faces may be the other unnamed face images that are displayed in display view 704. The matching face images may be displayed in a region 716 in a display view 706. The root face image is also displayed at a region 714. In the case where the matched face images are not accurate, the user can manually prune or grow the matched faces using another display view 708. These display views are illustrative and other display views or user interface elements may be used as would be apparent to a person skilled in the art given this description.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for matching object images to a root object image, comprising:
    (a) determining a list of object image lists, wherein: (i) each object image in the list of object image lists is at an origin of one of the object image lists, (ii) each object image list is ordered according to the similarity of each object image in the object image list to the object image at the origin of the object image list, and (iii) an object image list ordered according to the similarity of each image to the root object image is at the origin of the list of object image lists;
    (b) initializing an object extraction matrix with a column and a row corresponding to the object image list at the origin of the list of object image lists;
    repeatedly for respective object image lists in the list of object image lists, until the object extraction matrix is determined to follow a particular pattern in step (d):
    (c) repeatedly selecting, on a computing device, a previously unselected object image from the object image list such that the object images are selected from the object image list in an order based on a degree of similarity to the origin object image, for each selected object image:
        (i) comparing, on a computing device, the selected object image to the object image at the origin of the object image list, and
        (ii) flagging, on a computing device, a position (x, y) in the object extraction matrix, wherein position x corresponds to each object image from the origin of the list of object image lists and position y corresponds to the selected object image in step (c);
    (d) determining whether the flagged positions in the object extraction matrix follows the particular pattern; and
    (e) when the object extraction matrix is determined to follow the particular pattern, determining, on a computing device, a range of object images in the object image list at the origin of the list of object image lists, the range following the particular pattern, wherein each object image in the range of object images matches the root object image.

2. The method of claim 1, wherein the object images are face images.

3. The method of claim 1, wherein the determining
    (d) comprises determining whether elements flagged within the object extraction matrix resemble a square positioned toward the origin of the object extraction matrix.

4. A system for matching object images from a list of object images to a root object image, comprising:
    an object extraction module that:
        determines a list of object image lists, wherein: (i) each object image in the list of object image lists is at an origin of one of the object image lists, (ii) each object image list is ordered according to the similarity of each object image in the object image list to the object image at the origin of the object image list, and (iii) an object image list ordered according to the similarity of each image to the root object image is at the origin of the list of object image lists, and
        initializes an object extraction matrix with a column and a row corresponding to the object image list at the origin of the list of object image lists;
    a data structure generator module that:
        repeatedly for respective object image list in the list of object image lists, until the object extraction matrix is determined to follow a particular pattern:
            (a) repeatedly selects a previously unselected object image from the object image list such that the object images are selected from the object image list in an order based on a degree of similarity to the origin object image,
            for each selected object image:
                (b) compares the selected object image to the object image at the origin of the object image list, and
                (c) flags a position (x, y) in the object extraction matrix, wherein position x corresponds to each object image from the origin of the list of object image lists and position y corresponds to the selected object image in step (a); and a shape detector module that:
  determines whether the flagged positions in the object extraction matrix follows the particular pattern, and
  when the object extraction data matrix is determined to follow the particular pattern, determines a range of object images in the object image list at the origin of the list of object image lists, the range following the particular pattern, wherein each object image in the range of object images matches the root object image,
wherein the object extraction module, data structure generator module, and shape detector module are implemented on at least one processor and memory.

5. The system of claim 4, wherein the object images are face images.

6. The system of claim 4, wherein the shape detector module determines whether elements flagged within the object extraction matrix resemble a square positioned toward the origin of the data structure.

7. A method for determining which object images, from a plurality of object images, are similar to a root object image from the plurality of object images, comprising:
  (a) determining, on a computing device, an object similarity matrix with a first axis and a second axis such that each position x along the first axis corresponds to an object image from the plurality of object images and each position y along the second axis corresponds to an object image from the plurality of object images, wherein:
    (i) an order of object images along the first axis is the same of an order of object images along the second axis,
    (ii) the root object image corresponds to position 0 on the first axis and position 0 on the second axis,
    (iii) a value at a position (x, y) in the object similarity matrix represents a degree of similarity between an object image x on the first axis and an object image y on the second axis;
  (b) sorting the plurality of object images using the object similarity matrix, the sorting comprising:
    (i) for each unsorted object image on the first axis, determining, on a computing device, a score that is calculated using the value at each position (x, y), on the second axis, that corresponds to each sorted object image on the first axis,
    (ii) determining which of the unsorted object images has the highest score determined in (i),
    (iii) on both the first and second axis of the object similarity matrix, swapping, on a computing device, values corresponding to the object image determined in (ii) to have the highest score with values corresponding to each sorted object image, whereby the swapping sorts the previously unsorted object image, and
    (iv) repeating steps (i)-(iv) to sort each remaining unsorted object image in the object similarity matrix;
  (d) determining which of the plurality of object images are similar to the root object image based on an order of the sorted plurality of object images determined in (b).

8. The method of claim 7, wherein the object images are face images.

9. The method of claim 7, wherein the determining (a) comprises determining the object similarity matrix wherein an object image z is at the origin of the first and second axes, further comprising:
  (e) capturing an object image list according to the order of the sorted object images determined in (d); and
  (f) repeating steps (a)-(e) for each object image z to determine a list of object image lists.

10. The method of claim 9, wherein the list of object image lists is ordered according to relative similarity of the object image and the root object image, and each object image in the list of object images is at the origin of one of the object image lists, further comprising:
  (g) applying at least one element from each of the object image lists to an object extraction matrix; and
  (h) determining object images matching the root object image according to elements flagged within the object extraction matrix having a particular shape.

11. A system for determining the relative similarity of object images, comprising:
  an object similarity module that determines an object similarity matrix with a first axis and a second axis, wherein a value at a position (x, y) in the object similarity matrix represents a degree of similarity between an object image x on the first axis and an object image y on the second axis;
  a score evaluator module that determines for each unsorted object image on the first axis a score that is calculated using the value at each position (x, y), on the second axis, that corresponds to each sorted object image on the first axis, wherein each unsorted object image is determined as not having a highest score;
  a swap module that swaps the previously unsorted image on the first axis corresponding to the value at each position (x, y) on the second axis with the highest score determined by the score evaluation module with each sorted object image, wherein the swapped image is a sorted image; and
  an object ordering module that signals the score evaluator module and the swap module to repeatedly score and swap, sorting each remaining unsorted object image in the object similarity matrix,
  wherein the object similarity module, the score evaluator module, the swap module, and the object ordering module are implemented on at least one processor and memory.

12. The system of claim 11, wherein the object images are face images.

13. The system of claim 11, wherein the object similarity module determines the object similarity matrix wherein an object image z is at the origin of the first and second axes,
  wherein the object ordering module captures an object image list according to the order of the sorted object images, and signals the score evaluator module, the object similarity module, and the swap module to repeatedly sort for each object image z to determine a list of object image lists.

14. The system of claim 13, wherein the list of object image lists ordered according to relative similarity of the object image and the root object image, wherein each object image in the list of object images is at the origin of one of the object image lists, further comprising:
  a matrix generator module that applies at least one element from each of the object image lists to an object extraction matrix; and
  a shape detector module that determines object images matching the root object image according to elements flagged within the object extraction matrix having a particular shape.

* * * * *